US012647275B2

(12) United States Patent
El Khiyaoui et al.

(10) Patent No.: US 12,647,275 B2
(45) Date of Patent: Jun. 2, 2026

(54) AGGREGATE ANONYMOUS CREDENTIALS FOR DECENTRALIZED IDENTITY IN BLOCKCHAIN

(71) Applicant: International Business Machines Corporation, Armonk, NY (US)

(72) Inventors: Kaoutar El Khiyaoui, Zurich (CH); Angelo De Caro, Zürich (CH); Elli Androulaki, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 17/805,894

(22) Filed: Jun. 8, 2022

(65) Prior Publication Data

US 2023/0403161 A1 Dec. 14, 2023

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01); *H04L 9/3242* (2013.01); *H04L 9/3297* (2013.01)

(58) Field of Classification Search
CPC ... H04L 9/0825; H04L 9/3218; H04L 9/3242; H04L 9/3247; H04L 9/3255; H04L 9/3297; H04L 9/50
See application file for complete search history.

(56) References Cited

U.S. PATENT DOCUMENTS

| | | | | |
|---|---|---|---|---|
| 8,200,977 B2 * | 6/2012 | Yoshida | ............... | H04L 9/3013 |
| | | | | 713/180 |
| 8,583,932 B2 * | 11/2013 | Furukawa | ............. | H04L 9/3218 |
| | | | | 713/176 |
| 9,635,012 B2 * | 4/2017 | Camenisch | ............... | H04L 9/30 |
| 10,326,602 B2 * | 6/2019 | Park | ...................... | H04L 9/3218 |
| 10,735,205 B1 * | 8/2020 | Wentz | ................... | H04L 9/3257 |
| 11,451,519 B2 * | 9/2022 | Hwang | .............. | H04L 63/0884 |
| 11,658,827 B2 * | 5/2023 | Larmuseau | .......... | H04L 9/3247 |
| | | | | 713/176 |
| 12,050,679 B2 * | 7/2024 | Jogand-Coulomb | ... | G06F 21/45 |
| 2010/0169656 A1 * | 7/2010 | Yoshida | ................ | H04L 9/3255 |
| | | | | 713/180 |

(Continued)

FOREIGN PATENT DOCUMENTS

| | | | | |
|---|---|---|---|---|
| KR | 20210064076 A | | 6/2021 | |
| WO | WO2020185582 A1 * | 9/2020 | ........... | H04L 9/3247 |

OTHER PUBLICATIONS

Naserameri, Improving privacy in Blockchain by Combining Group Signature and Groth-Sahai Certification System, in Proceedings of the Sixth International Conference on Intelligent Computing and Control Systems (May 25, 2022) (Year: 2022).*

(Continued)

*Primary Examiner* — Sharon S Lynch
(74) *Attorney, Agent, or Firm* — Seed Intellectual Property Law Group LLP

(57) ABSTRACT

A system may prove one or more attributes of a user by generating cyclic groups, generating an aggregate anonymous credential by a regulatory authority and issuers of the system, setting up an issuer with a multi-signature of administrators of the system, generating user credentials, and validating an operation signed with the user credentials.

20 Claims, 13 Drawing Sheets

(56) References Cited

U.S. PATENT DOCUMENTS

| | | | | |
|---|---|---|---|---|
| 2012/0060028 | A1* | 3/2012 | Furukawa | H04L 9/3218 |
| | | | | 713/156 |
| 2014/0359289 | A1* | 12/2014 | Camenisch | H04L 9/30 |
| | | | | 713/168 |
| 2019/0052470 | A1* | 2/2019 | Park | H04L 9/3255 |
| 2020/0358600 | A1 | 11/2020 | Xu | |
| 2020/0412546 | A1* | 12/2020 | Larmuseau | H04L 9/3218 |
| 2021/0160223 | A1* | 5/2021 | Hwang | H04L 9/30 |
| 2022/0222330 | A1* | 7/2022 | Jogand-Coulomb | G06F 21/33 |

OTHER PUBLICATIONS

Google Translation of CN109413078B (published Aug. 3, 2021) (Translated Sep. 5, 2025) (Year: 2021).*

Belenkiy, et al., "P-signatures and Noninteractive Anonymous Credentials." Published in 2008 by Springer. 19 pages. In TCC 2008: Theory of Cryptography pp. 356-374. https://link.springer.com/chapter/10.1007/978-3-540-78524-8_20.

Belenkiy, et al., "Randomizable Proofs and Delegatable Anonymous Credentials." Published in 2009 by Springer. 18 pages. In Crypto 2009: Advances in Cryptology—Crypto 2009 pp. 108-125. https://link.springer.com/chapter/10.1007/978-3-642-03356-8_7.

Camenisch, et al., "Efficient Attributes for Anonymous Credentials." Published Mar. 1, 2012 by ACM. 30 pages. In ACM Transactions on Information and System Security, vol. 15, Issue 1. Article No. 4, pp. 1-30. https://doi.org/10.1145/2133375.2133379.

Camenisch, et al., "Practical UC-Secure Delegatable Credentials with Attributes and Their Application to Blockchain." Published Oct. 30, 2017 by ACM. 17 pages. In CCS '17: Proceedings of the 2017 ACM SIGSAC Conference on Computer and Communications Security, pp. 683-699. https://doi.org/10.1145/3133956.3134025.

Camenisch, et al., "Signature Schemes and Anonymous Credentials from Bilinear Maps." Published in 2004 by Springer. 17 pages. In Crypto 2004: Advances in Cryptology—Crypto 2004 pp. 56-72. https://link.springer.com/chapter/10.1007/978-3-540-28628-8_4.

Canard, et al., "Anonymous Credentials from (Indexed) Aggregate Signatures." Published Oct. 21, 2011 by ACM. 10 pages. In Proceedings of the 7th ACM workshop on Digital identity management, pp. 53-62, 2011.

Krenn, et al., "Towards Attribute-Based Credentials in the Cloud." Published Nov. 10, 2018 by Springer. In International Conference on Cryptology and Network Security, pp. 179-202, Cham, 2017, 24 pages. DOI: 10.1007/978-3-030-02641-7_9.

Xudong, et al., "Designated-Verifier Anonymous Credential for Identity Management in Decentralized Systems." Published Sep. 10, 2021 by Hindawi. In Mobile Information Systems, Article ID 2807395, 15 pages, https://doi.org/10.1155/2021/2807395.

* cited by examiner

New Data Block

430

Block Header 440

| Number | Previous Hash |

Data Block 450

N Transactions

| Type, Version, Channel ID, Tx ID, ... |

| Chaincode Data | Endorser Data |

| Read Set | Write Set |

| New Data 462 |

Block Metadata 460

| Orderer Data | Signatures |

| Last Configuration | Valid/Invalid Txs |

470

480　　　480　　　480

Header
472₁

File with
Metadata
474₁

Value
476₁

Block 1
478₁

Header
472₂

File with
Metadata
474₂

Value
476₂

Block 2
478₂

Header
472ₙ

File with
Metadata
474ₙ

Value
476ₙ

Block N
478ₙ

490

Block$_i$

| Header 472$_i$ |
| --- |
| - Hash Value of Previous Block<br>- Reference Information |

File(s) (and Metadata) 474$_i$

| Data 1 | REF 1 | Metadata 1 |
| --- | --- | --- |
| Data 2 | REF 2 | Metadata 2 |
| . | . | . |
| . | . | . |
| . | . | . |
| . | . | . |
| . | . | . |
| . | . | . |
| Data N | REF N | Metadata N |

Value 476$_i$ (based on one or more of)

- New Hash Value of File
- New Storage Location of File
- New Metadata Assigned to File
- Transfer Access/Control to New Blockchain Participant
- New/Existing/Change of Ownership of the File

FIG. 4D

AGGREGATE ANONYMOUS CREDENTIALS FOR DECENTRALIZED IDENTITY IN BLOCKCHAIN

BACKGROUND

The present disclosure relates to processing of operations on a blockchain network, and more specifically to aggregate anonymous credentials and applications to decentralized identity in blockchain systems.

A blockchain is a list of cryptographically linked records, called blocks. Blockchain networks may be used to regulate different types of operations by a variety of parties. Blockchain may be used to prove attributes about a user.

SUMMARY

Embodiments of the present disclosure include a system, method, and computer program product for aggregate anonymous credentials and applications to decentralized identity in blockchain systems in a blockchain network.

Embodiments of the present disclosure include a system comprising a memory, and a processor in communication with the memory, the processor being configured to perform operations comprising generating cyclic groups, generating an aggregate anonymous credential by a regulatory authority of the system, setting up an issuer with a multi-signature of administrators of the system, generating user credentials, and validating an operation signed with the user credentials.

Additional embodiments of the present disclosure include a method comprising generating cyclic groups, generating an aggregate anonymous credential by a regulatory authority of the system, setting up an issuer with a multi-signature of administrators of the system, generating user credentials, and validating an operation signed with the user credentials.

Further embodiments of the present disclosure include a computer program product comprising a computer readable storage medium having program instructions embodied therewith, the program instructions executable by a processor to cause the processors to perform a method, the method comprising generating cyclic groups, generating an aggregate anonymous credential by a regulatory authority of the system, setting up an issuer with a multi-signature of administrators of the system, generating user credentials, and validating an operation signed with the user credentials.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

FIG. 4D illustrates a block which may represent the structure of blocks in the blockchain, according to example embodiments.

Figure 1:
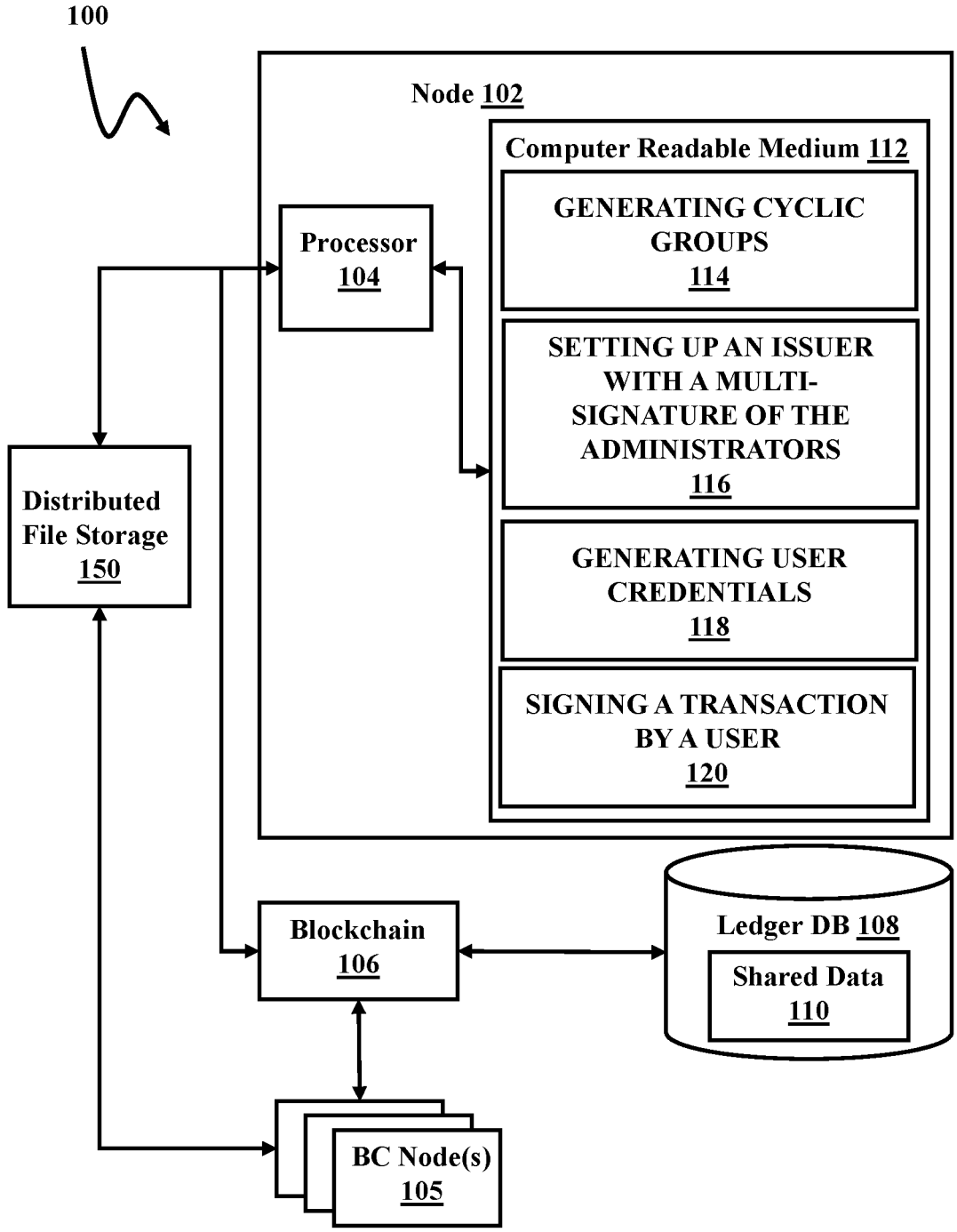
FIG. 1 illustrates a network diagram of a system including a database, according to example embodiments.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to processing of operations on a blockchain network, and more specifically to aggregate anonymous credentials and applications to decentralized identity in blockchain systems.

It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIG-URES, any connection between elements can permit one-way and/or two-way communication even if the depicted connection is a one-way or two-way arrow. Also, any device depicted in the drawings can be a different device. For example, if a mobile device is shown sending information, a wired device may also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

In some embodiments, the method, system, and/or computer program product utilize a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records, and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency.

In various embodiments, a permissioned and/or a permission-less blockchain can be used. In a public or permission-less blockchain, anyone can participate without a specific identity (e.g., retaining anonymity). Public blockchains can involve native cryptocurrency and use consensus based on various protocols such as Proof of Work. On the other hand, a permissioned blockchain database provides secure interactions among a group of entities which share a common goal but which do not fully trust one another, such as businesses that exchange funds, goods, information, and the like.

Further, in some embodiments, the method, system, and/or computer program product can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The method, system, and/or computer program product can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain, while transactions which are not endorsed are disregarded.

An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

In some embodiments, the method, system, and/or computer program product can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer) and broadcasts transaction-proposals to an ordering service (e.g., ordering node).

Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes. In some instances, an ordering service node implements a delivery guarantee, such as a broadcast to each of the peer nodes in the system when committing/confirming transactions and modifying a world state of the blockchain. World state is another name for the initial blockchain transaction which normally includes control and setup information.

In some embodiments, the method, system, and/or computer program product can utilize a ledger that is a sequenced, tamper-resistant record of all state transitions of a blockchain. State transitions may result from chaincode invocations (e.g., transactions) submitted by participating parties (e.g., client nodes, ordering nodes, endorser nodes, peer nodes, etc.). Each participating party (such as a peer node) can maintain a copy of the ledger. In some embodiments, a participating party is a party (e.g., an organization with nodes on a blockchain network) that is involved in an operation. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

In some embodiments, the method, system, and/or computer program product described herein can utilize a chain that is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log; it can therefore be regenerated from the chain at any time. The state database may automatically be recovered (or generated if needed) upon peer node startup and before transactions are accepted.

Blockchain is different from a traditional database in that blockchain is not a central storage, but rather a decentralized, immutable, and secure storage, where nodes may share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein.

In particular, the blockchain ledger data is immutable, and that provides for an efficient method for processing operations in blockchain networks. Also, use of the encryption in the blockchain provides security and builds trust. The smart contract manages the state of the asset to complete the life-cycle, thus specialized nodes may ensure that blockchain operations with anonymity requirements are able to securely submit operations to the blockchain network. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set and write-set. In other words, the blockchain inherent features provide for efficient implementation of processing a private transaction in a blockchain network.

One of the benefits of the example embodiments is that they improve the functionality of a computing system by implementing a method for processing a private transaction in a blockchain network. Through the blockchain system described herein, a computing system (or a processor in the computing system) can perform functionality for private transaction processing utilizing blockchain networks by providing access to capabilities such as distributed ledger, peers, encryption technologies, MSP, event handling, etc. Also, the blockchain enables creating a business network and making any users or organizations to on-board for participation. As such, the blockchain is not just a database. The blockchain comes with capabilities to create a network of users and on-board/off-board organizations to collaborate and execute service processes in the form of smart contracts.

Meanwhile, a traditional database may not be useful to implement the example embodiments because a traditional database does not bring all parties on the network, a traditional database does not create trusted collaboration, and a traditional database does not provide for an efficient method of securely and efficiently submitting operations. The traditional database does not provide for a tamper proof storage and does not provide for guaranteed valid transactions. Accordingly, the example embodiments provide for a specific solution to a problem in the arts/field of anonymously submitting operations in a blockchain network.

FIG. 1 illustrates a logic network diagram for a network 100 for smart data annotation in blockchain networks, according to example embodiments.

Referring to FIG. 1, the example network 100 includes a node 102 connected to other blockchain (BC) nodes 105 representing document-owner organizations. The node 102 may be connected to a blockchain 106 that has a ledger 108 for storing data to be shared 110 among the nodes 105. While this example describes in detail only one node 102, multiple such nodes may be connected to the blockchain 106. It should be understood that the node 102 may include additional components and that some of the components described herein may be removed and/or modified without departing from a scope of the node 102 disclosed herein. The node 102 may be a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the node 102 may include multiple processors, multiple cores, or the like, without departing from the scope of the node 102 system. A distributed file storage 150 may be accessible to processor node 102 and other BC nodes 105. The distributed file storage 150 may be used to store documents identified in ledger 108.

The node 102 may also include a non-transitory computer readable medium 112 that may have stored thereon machine-readable instructions executable by the processor 104. Examples of the machine-readable instructions are shown as 114-118 and are further discussed below. Examples of the non-transitory computer readable medium 112 may include an electronic, magnetic, optical, or other physical storage device that contains or stores executable instructions. For example, the non-transitory computer readable medium 112 may be a Random Access memory (RAM), an Electrically Erasable Programmable Read-Only Memory (EEPROM), a hard disk, an optical disc, or other type of storage device.

The processor 104 may execute machine-readable instructions 114 generating cyclic groups. As discussed above, the blockchain ledger 108 may store data to be shared 110 among the nodes 105. The blockchain 106 network may be configured to use one or more smart contracts that manage transactions for multiple participating nodes. Documents linked to the annotation information may be stored in distributed file storage 150. The processor 104 may execute machine-readable instructions 116 setting up an issuer with a multi-signature of the administrators. The processor 104 may execute machine-readable instructions 118 generating user credentials. The processor 104 may execute machine-readable instructions 120 signing a transaction by the user.

Figure 2A:
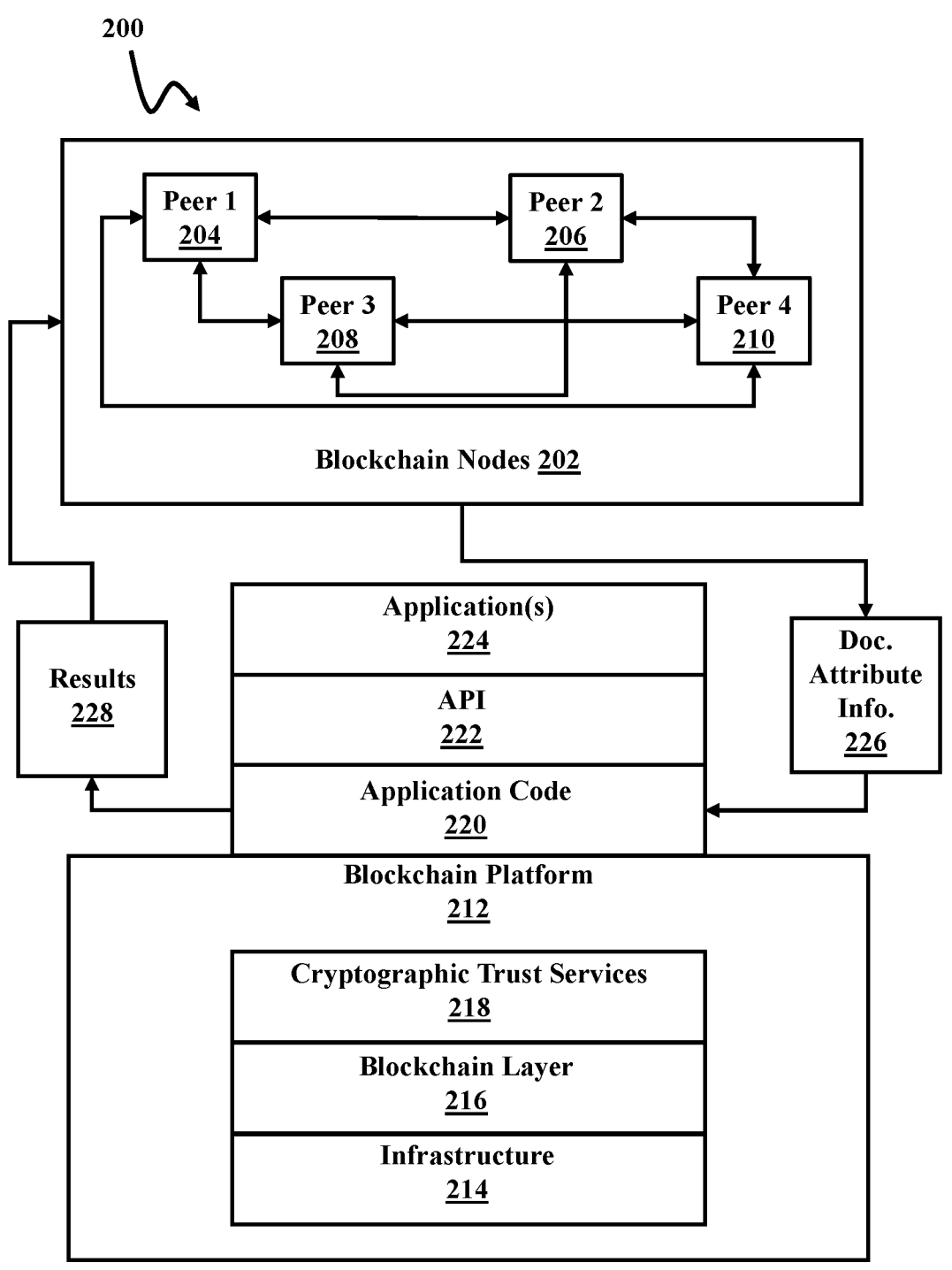
FIG. 2A illustrates an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more peer nodes 204, 206, 208, 210 (these four nodes are depicted by example only). These nodes participate in a number of activities, such as blockchain transaction addition and validation processes (consensus). One or more of the blockchain nodes 204-210 may endorse transactions based on an endorsement policy and may provide an ordering service for all blockchain nodes 202 in the architecture 200. A blockchain node 204-210 may initiate a blockchain authentication and seek to write to a blockchain immutable ledger stored in blockchain layer 216, a copy of which may also be stored on an underpinning physical infrastructure 214. The blockchain configuration 200 may include one or more applications 224 which are linked to application programming interfaces (APIs) 222 to access and execute stored program/application code 220 (e.g., chaincode, smart contracts, etc.) which can be created according to a customized configuration sought by participants and can maintain the participant's own state, control the participant's own assets, and receive external information. This can be deployed as a transaction and installed, via appending to the distributed ledger, on all blockchain nodes 204-210.

A blockchain base or platform 212 may include various layers of blockchain data, services (e.g., cryptographic trust services, virtual execution environment, etc.), and underpinning physical computer infrastructure 214 that may be used to receive and store new transactions and provide access to auditors which are seeking to access data entries. The blockchain layer 216 may expose an interface that provides access to the virtual execution environment necessary to process the program code 220 and engage the physical infrastructure 214. Cryptographic trust services 218 may be used to verify transactions such as asset exchange transactions and keep information private.

The blockchain architecture configuration 200 of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, document attribute(s) information 226 may be processed by one or more processing entities (e.g., virtual machines) included in the blockchain layer 216. Results 228 of this processing may include a plurality of linked shared documents. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
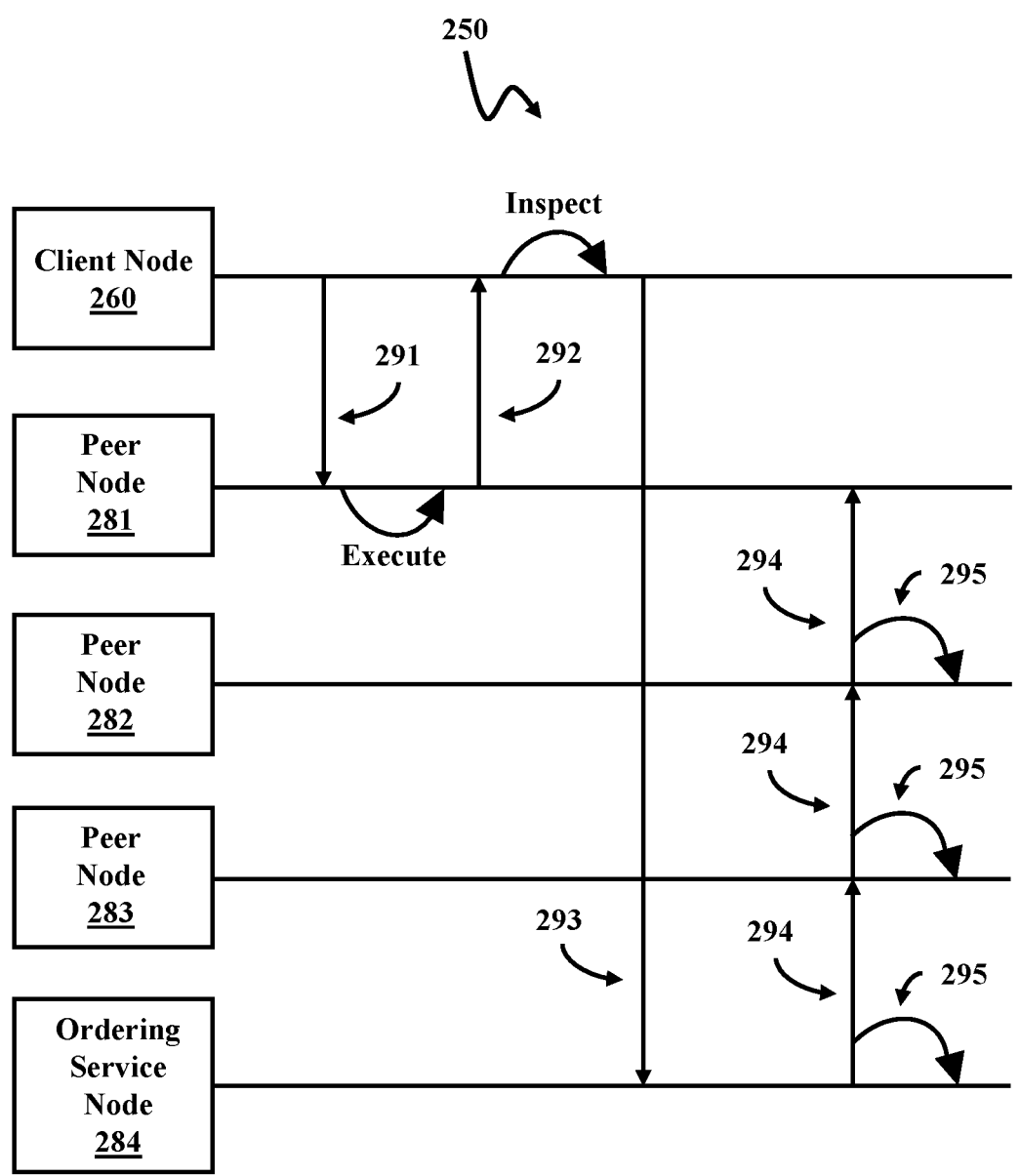
FIG. 2B illustrates a blockchain transactional flow, according to example embodiments.

FIG. 2B illustrates an example of a blockchain transactional flow 250 between nodes of a blockchain (e.g., blockchain 106 illustrated in FIG. 1), in accordance with an example embodiment. Referring to FIG. 2B, a general description of the transactional flow 250 will be given followed by a more specific example. The transactional flow 250 may include a transaction proposal 291 sent by an application client node 260 to a first endorsing peer node 281. The first endorsing peer 281 may verify a client signature and execute a chaincode function to initiate the transaction. The output may include the chaincode results, a set of key/value versions that were read in the chaincode (read set), and the set of keys/values that were written in chaincode (write set). A proposal response 292 is sent back to the client 260 along with an endorsement signature, if approved. The client 260 assembles the endorsements into a transaction payload 293 and broadcasts it to an ordering service (fourth peer) node 284. The ordering service node 284 then delivers ordered transactions as blocks to all additional peers 281, 282, and 283 on the same channel. Before committal to the blockchain, each additional peer 281-283 may validate the transaction. For example, the peers 281-283 may check the endorsement policy to ensure that the correct allotment of the peers specified in transaction proposal 291 have signed the results and authenticated the signatures against the transaction payload 293. In some embodiments, one or more of the peers may be manager nodes.

A more specific description of transactional flow 250 can be understood with a more specific example. To begin, the client node 260 initiates the transaction proposal 291 by constructing and sending a request to the first peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. The set of transaction results, along with the endorsing peer node's 281 signature is passed back as a proposal response 292 to the SDK of the client 260 which parses the payload for the application to consume.

In response, the application of the client 260 inspects/verifies the endorsing peer's 281 signature and compares the proposal response 292 to determine if the proposal response 292 is valid. If the chaincode only queried the ledger, the application would inspect the query response and would typically not submit the transaction to the ordering service node 284. If the client application intends to submit the transaction to the ordering service node 284 to update the ledger, the application determines if the specified endorsement policy has been fulfilled before submitting (i.e., did all peer nodes necessary for the transaction endorse the transaction). Here, the client 260 may include only one of multiple parties to the transaction. In this case, each client may have their own endorsing node, and each endorsing node may need to endorse the transaction. The architecture is such that even if an application selects not to inspect responses or otherwise forwards an unendorsed transaction, the endorsement policy may still be enforced by peers and upheld at the commit validation phase.

After successful inspection, the client 260 assembles endorsements into a transaction 293 and broadcasts the transaction proposal and response within a transaction message to the ordering node 284. The transaction 293 may contain the read/write sets, the endorsing peer's signatures and a channel ID. The ordering node 284 does not need to inspect the entire content of a transaction in order to perform its operation. Instead, the ordering node 284 may simply receive transactions from all channels in the network, order them chronologically by channel, and create blocks of transactions per channel.

The blocks of the transaction 293 are delivered from the ordering node 284 to all other peer nodes 281-283 on the channel. Transactions 294 within the block are validated to ensure any endorsement policy is fulfilled and to ensure that there have been no changes to ledger state for read set variables since the read set was generated by the transaction execution. Transactions 294 in the block are tagged as being valid or invalid. Furthermore, in operation 295 each peer node 281-283 appends the block to the channel's chain, and for each valid transaction the write sets are committed to current state database. An event is emitted to notify the client application that the transaction (invocation) 293 has been immutably appended to the chain, as well as to notify whether the transaction 293 was validated or invalidated.

Figure 3A:
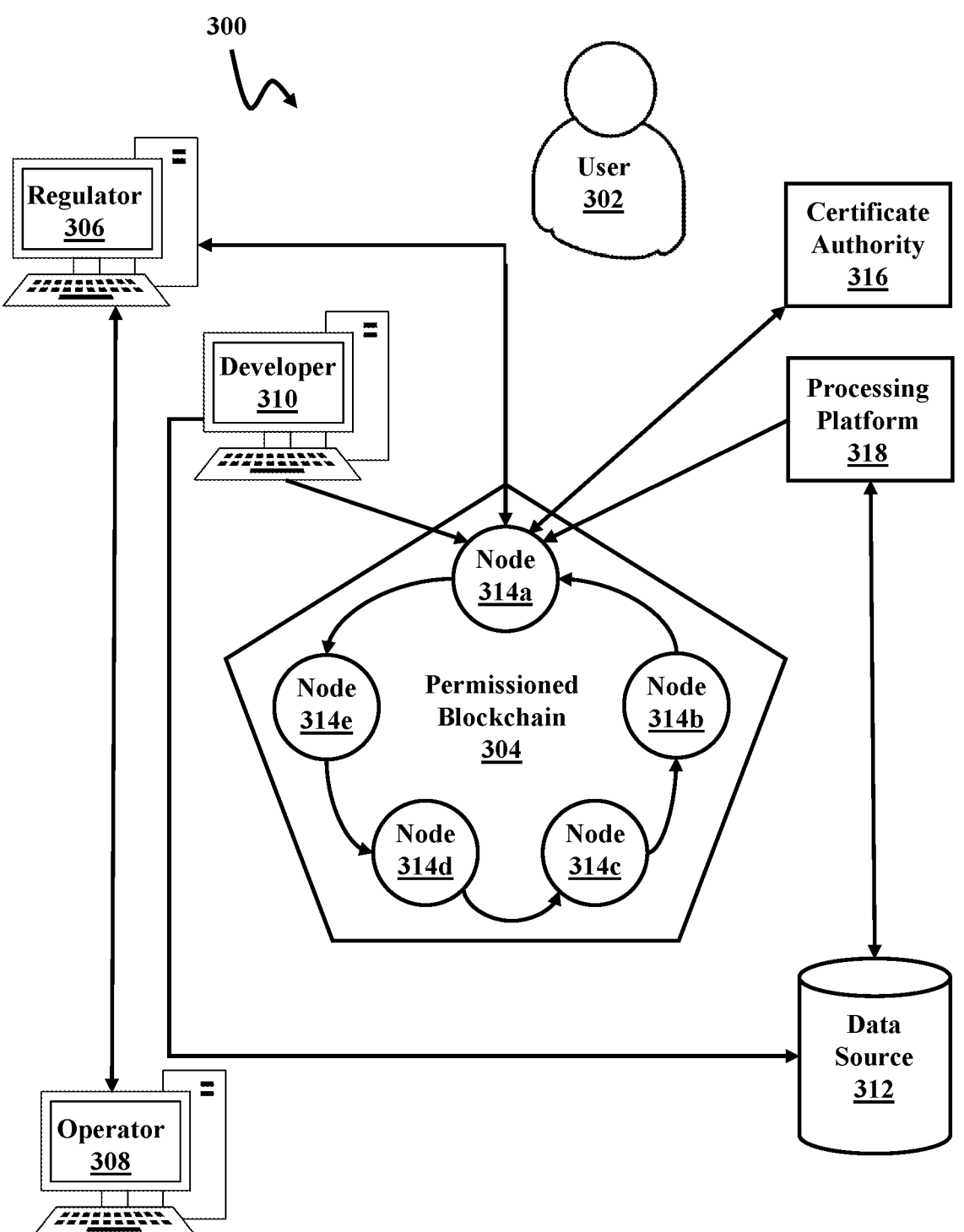
FIG. 3A illustrates a permissioned network, according to example embodiments.

FIG. 3A illustrates an example of a permissioned blockchain network 300, in accordance with an example embodiment, which features a distributed, decentralized peer-to-peer architecture. In this example, a blockchain user 302 may initiate a transaction to a permissioned blockchain 304. In this example, the transaction can be a deploy, invoke, or query, and may be issued through a client-side application leveraging an SDK, directly through an API, etc. The network 300 may provide access to a regulator 306, such as an auditor. A blockchain network operator 308 manages member permissions, such as enrolling the regulator 306 as an "auditor" and the blockchain user 302 as a "client." An auditor may be restricted only to querying the ledger whereas a client may be authorized to deploy, invoke, and query certain types of chaincode.

A blockchain developer 310 can write chaincode and client-side applications. The blockchain developer 310 can deploy chaincode directly to the network 300 through an interface. To include credentials from a traditional data source 312 in chaincode, the developer 310 may use an out-of-band connection to access the data. In this example, the blockchain user 302 connects to the permissioned blockchain 304 through one of peer nodes 314 (referring to any one of nodes 314*a-e*). Before proceeding with any transactions, the peer node 314 (e.g., node 314*a*) retrieves the user's 302 enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's 302 authorization, chaincode can use an out-of-band connection to this data through a traditional processing platform 318.

Figure 3B:
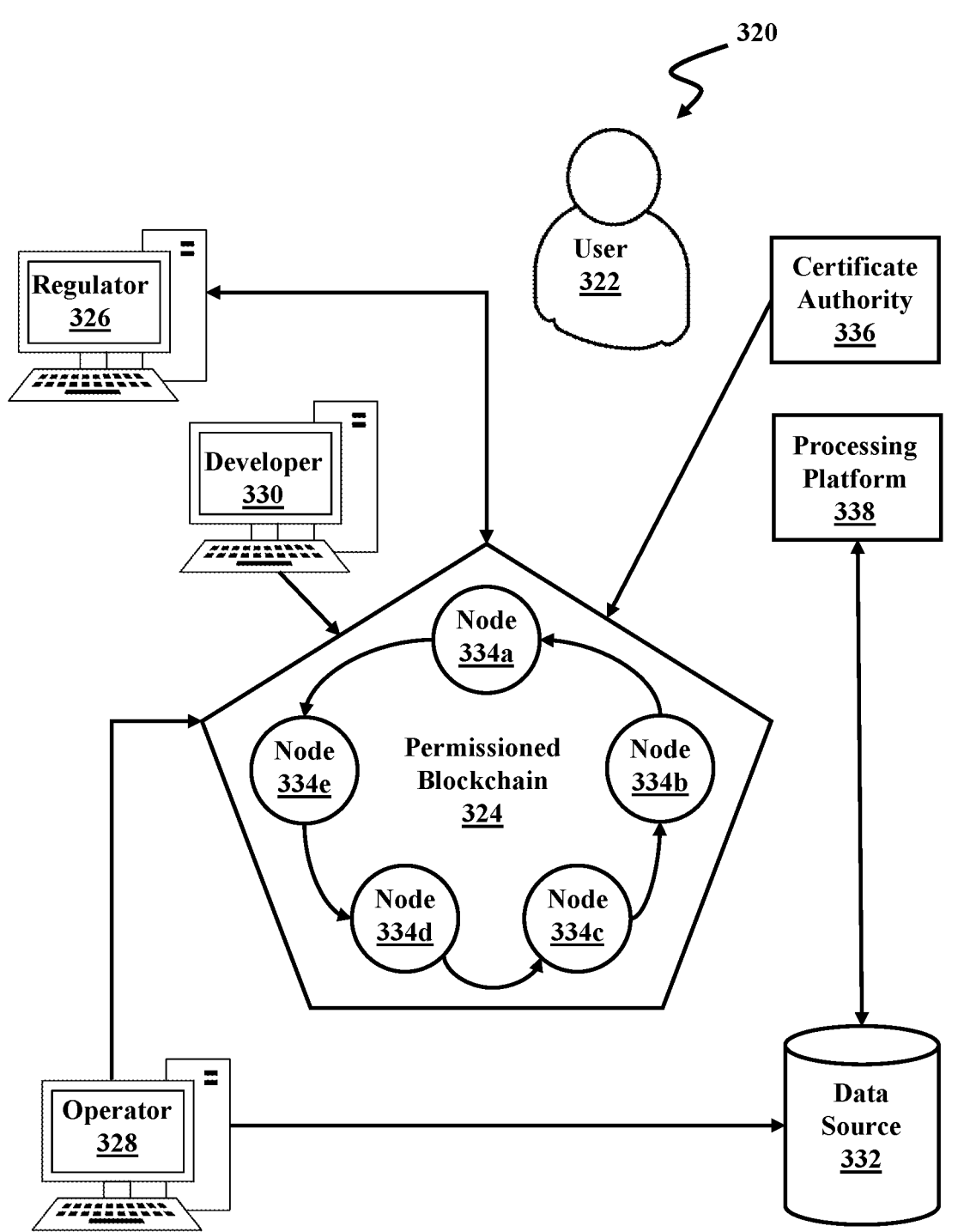
FIG. 3B illustrates another permissioned network, according to example embodiments.

FIG. 3B illustrates another example of a permissioned blockchain network 320, in accordance with an example embodiment, which features a distributed, decentralized peer-to-peer architecture. In this example, a blockchain user 322 may submit a transaction to a permissioned blockchain

324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client." An auditor may be restricted to only querying the ledger whereas a client may be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 may use an out-of-band connection to access the data. In this example, the blockchain user 322 connects to the network through a peer node 334 (referring to any one of nodes 334*a-e*). Before proceeding with any transactions, the peer node 334 (e.g., node 334*a*) retrieves the user's enrollment and transaction certificates from a certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments of the present disclosure, a blockchain herein may be a permissionless blockchain. In contrast with permissioned blockchains (e.g., blockchains 304 and 324) which require permission to join, anyone can join a permissionless blockchain. For example, to join a permissionless blockchain a user may create a personal address and begin interacting with the network by submitting transactions, and hence adding entries to the ledger. Additionally, all parties have the choice of running a node on the system and employing the mining protocols to help verify transactions.

Figure 3C:
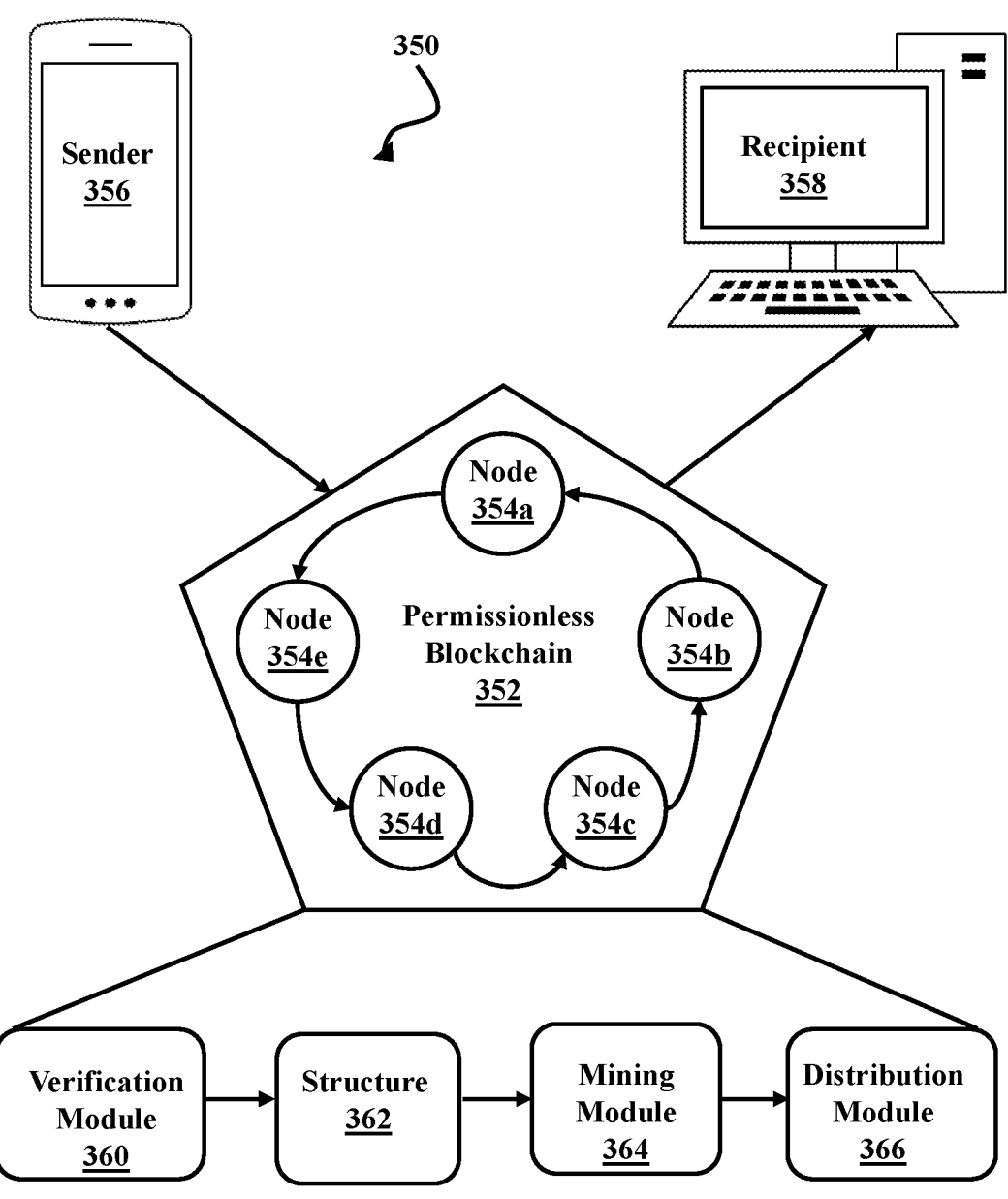
FIG. 3C illustrates a permissionless network, according to example embodiments.

FIG. 3C illustrates a network 350 with a transaction being processed by a permissionless blockchain 352 including a plurality of nodes 354, in accordance with an example embodiment. A sender 356 desires to send payment or some other form of value (e.g., a deed, medical records, a contract, a good, a service, or any other asset that can be encapsulated in a digital record) to a recipient 358 via the permissionless blockchain 352. In some embodiments, each of the sender device 356 and the recipient device 358 may have digital wallets (associated with the blockchain 352) that provide user interface controls and a display of transaction parameters. In response, the transaction is broadcast throughout the blockchain 352 to the nodes 354 (referring to any one of nodes 354*a-e*).

Depending on the blockchain's 352 network parameters the nodes use verification module 360 to verify the transaction based on rules (which may be pre-defined or dynamically allocated) established by the permissionless blockchain 352 creators. For example, this may include verifying identities of the parties involved, etc. The transaction may be verified immediately, or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352.

Each block may be identified by a hash (e.g., 256 bit number, etc.) created using an algorithm agreed upon by the network 350. Each block may include a header, a pointer or reference to a hash of a previous block's header in the chain, and a group of valid transactions. The reference to the previous block's hash is associated with the creation of the secure independent chain of blocks.

Before blocks can be added to the blockchain 352, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining module 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications to the blockchain 352 extremely difficult, as an attacker must modify all subsequent blocks in order for the modifications to one block to be accepted. Furthermore, as new blocks are mined, the difficulty of modifying a block increases, and the number of subsequent blocks increases. With a distribution module 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 4A:
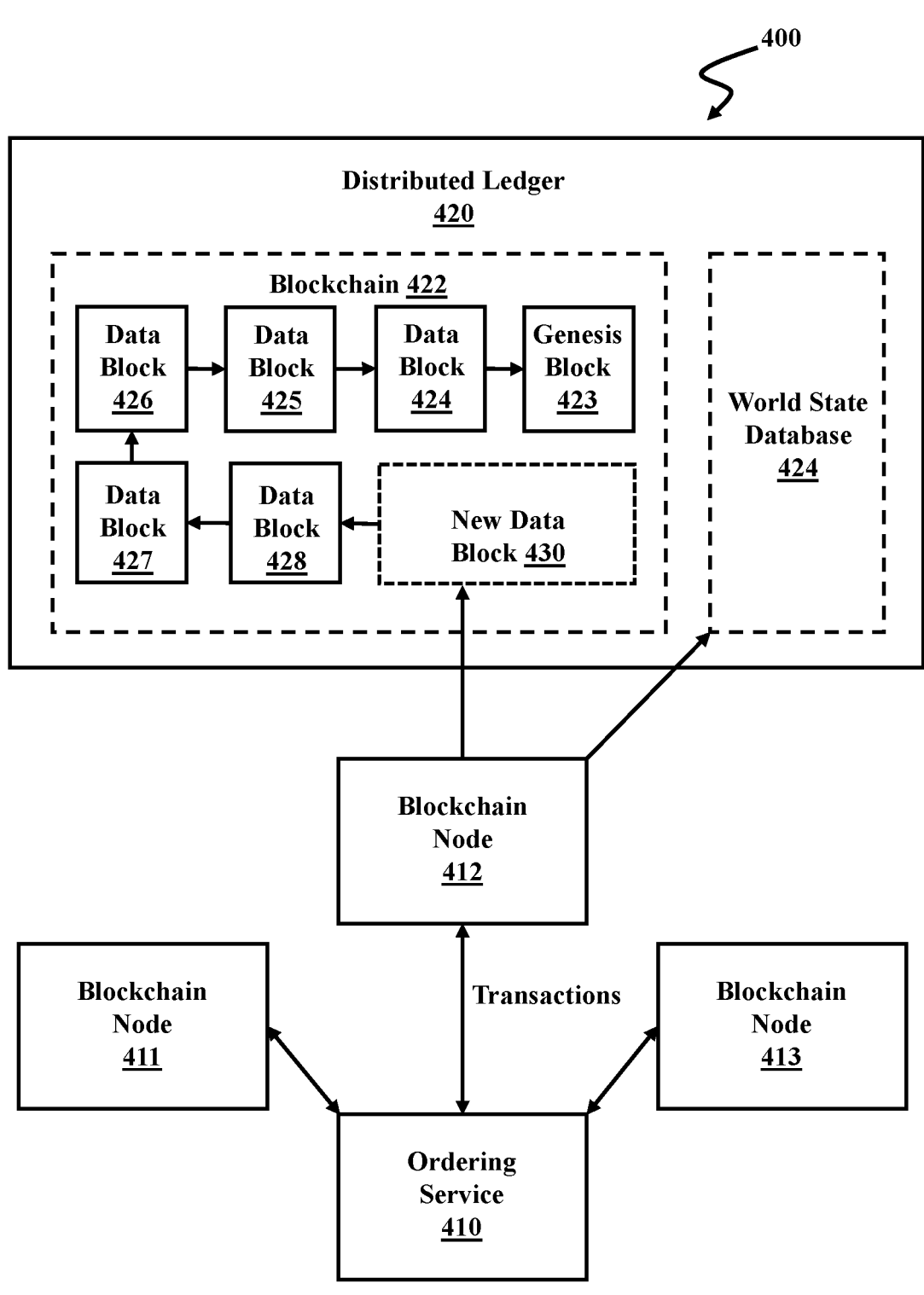
FIG. 4A illustrates a process for a new block being added to a distributed ledger, according to example embodiments.
Figure 4B:
FIG. 4B illustrates contents of a new data block, according to example embodiments.

FIG. 4A illustrates a blockchain system performing process 400 of a new block being added to a distributed ledger 420, according to example embodiments, and FIG. 4B illustrates contents of a new data block structure 430 for blockchain, according to example embodiments. The new data block 430 may contain document linking data.

Referring to FIG. 4A, clients (not shown) may submit transactions to blockchain nodes 411, 412, and/or 413 in process 400. Clients may be instructions received from any source to enact activity on the blockchain 422. As an example, clients may be applications that act on behalf of a requester, such as a device, person or entity to propose transactions for the blockchain 422. The plurality of blockchain peers (e.g., blockchain nodes 411, 412, and 413) may maintain a state of the blockchain network and a copy of the distributed ledger 420. Different types of blockchain nodes/peers may be present in the blockchain network including endorsing peers which simulate and endorse transactions proposed by clients and committing peers which verify endorsements, validate transactions, and commit transactions to the distributed ledger 420. In this example, each of blockchain nodes 411, 412, and 413 may perform a role of endorser node, committer node, or both.

The distributed ledger 420 includes a blockchain which stores immutable, sequenced records in blocks (e.g., data blocks 423, 424, 425, 426, 427, 428, 429, and 430), and a state database 424 (current world state) maintaining a current state of the blockchain 422. One distributed ledger 420 may exist per channel and each peer maintains its own copy of the distributed ledger 420 for each channel of which they are a member. The blockchain 422 is a transaction log, structured as hash-linked blocks where each block contains a sequence of N transactions. Blocks may include various components such as shown in FIG. 4B. The linking (shown by arrows in FIG. 4A) of the blocks (e.g., data blocks 423-430) may be generated by adding a hash of a prior block's header within a block header of a current block. In this way, all transactions on the blockchain 422 are sequenced and cryptographically linked together preventing tampering with blockchain data without breaking the hash links. Furthermore, because of the links, the latest block (e.g., data block 430) in the blockchain 422 represents every transaction that has come before it. The blockchain 422 may be stored on a peer file system (local or attached storage), which supports an append-only blockchain workload.

The current state of the blockchain 422 and the distributed ledger 420 may be stored in the state database 424. Here, the current state data represents the latest values for all keys ever included in the chain transaction log of the blockchain 422. Chaincode invocations execute transactions against the current state in the state database 424. To make these chaincode interactions extremely efficient, the latest values of all keys are stored in the state database 424. The state database 424 may include an indexed view into the transaction log of the blockchain 422. It can therefore be regenerated from the chain at any time. The state database 424 may automatically get recovered (or generated if needed) upon peer startup, before transactions are accepted.

Endorsing nodes (411, 412, and/or 413) receive transactions from clients and endorse the transaction based on simulated results. Endorsing nodes hold smart contracts which simulate the transaction proposals. When an endorsing node endorses a transaction, the endorsing node creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to ordering service 410.

The ordering service 410 accepts endorsed transactions, orders them into a block, and delivers the blocks to the committing peers. For example, the ordering service 410 may initiate a new block when a threshold of transactions has been reached, a timer times out, or another condition. In the example of FIG. 4A, blockchain node 412 is a committing peer that has received a new data block 430 for storage on blockchain 422. The first block 423 in the blockchain 422 may be referred to as a genesis block which includes information about the blockchain, its members, the data stored therein, etc.

The ordering service 410 may be made up of a cluster of orderers. The ordering service 410 does not process transactions, smart contracts, or maintain the shared ledger. Rather, the ordering service 410 may accept the endorsed transactions and specifies the order in which those transactions are committed to the distributed ledger 420. The architecture of the blockchain network may be designed such that the specific implementation of 'ordering' (e.g., Solo, Kafka, Byzantine fault-tolerant, etc.) becomes a pluggable component.

Transactions are written to the distributed ledger 420 in a consistent order. The order of transactions is established to ensure that the updates to the state database 424 are valid when they are committed to the network. Unlike a crypto-currency blockchain system (e.g., Bitcoin, etc.) where ordering occurs through the solving of a cryptographic puzzle, or mining, in this example the parties of the distributed ledger 420 may choose the ordering mechanism that best suits that network.

When the ordering service 410 initializes a new data block 430, the new data block 430 may be broadcast to committing peers (e.g., blockchain nodes 411, 412, and 413). In response, each committing peer validates the transaction within the new data block 430 by checking to make sure that the read set and the write set still match the current world state in the state database 424. Specifically, the committing peer can determine whether the read data that existed when the endorsers simulated the transaction is identical to the current world state in the state database 424. When the committing peer validates the transaction, the transaction is written to the blockchain 422 on the distributed ledger 420, and the state database 424 is updated with the write data from the read-write set. If a transaction fails, that is, if the committing peer finds that the read-write set does not match the current world state in the state database 424, the transaction ordered into a block may still be included in that block, but it may be marked as invalid, and the state database 424 may not be updated.

Referring to FIG. 4B, the new data block 430 (also referred to as a data block) that is stored on the blockchain 422 of the distributed ledger 420 may include multiple data segments such as a block header 440, block data 450, and block metadata 460. It should be appreciated that the various depicted blocks and their contents, such as new data block 430 and its contents. Shown in FIG. 4B are merely examples and are not meant to limit the scope of the example embodiments. The new data block 430 may store transactional information of N transaction(s) (e.g., 1, 10, 100, 500, 1000, 2000, 3000, etc.) within the block data 450. The new data block 430 may also include a link to a previous block (e.g., on the blockchain 422 in FIG. 4A) within the block header 440. In particular, the block header 440 may include a hash of a previous block's header. The block header 440 may also include a unique block number (e.g., data block 423-430), a hash of the block data 450 of the new data block 430, and the like. The block number of the new data block 430 may be unique and assigned in various orders, such as an incremental/sequential order starting from zero.

The block data 450 may store transactional information of each transaction that is recorded within the new data block 430. For example, the transaction data may include one or more of a type of the transaction, a version, a timestamp, a channel ID of the distributed ledger 420, a transaction ID, an epoch, a payload visibility, a chaincode path (deploy transaction), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 450 may also store new data 462 which adds additional information to the hash-linked chain of blocks in the blockchain 422. The additional information includes one or more of the steps, features, processes and/or actions described or depicted herein. Accordingly, the new data 462 can be stored in an immutable log of blocks on the distributed ledger 420. Some of the benefits of storing such new data 462 are reflected in the various embodiments disclosed and depicted herein. Although in FIG. 4B the new data 462 is depicted in the block data 450, it may also be located in the block header 440 or the block metadata 460. The new data 462 may include a document composite key that is used for linking the documents within an organization.

The block metadata 460 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 410. Meanwhile, a committer of the block (such as blockchain node 412) may add validity/invalidity information based on an endorsement policy, verification of read/write sets, and the like. The transaction filter may include a byte array of a size equal to the number of transactions in the block data 450 and a validation code identifying whether a transaction was valid/invalid.

Figure 4C:
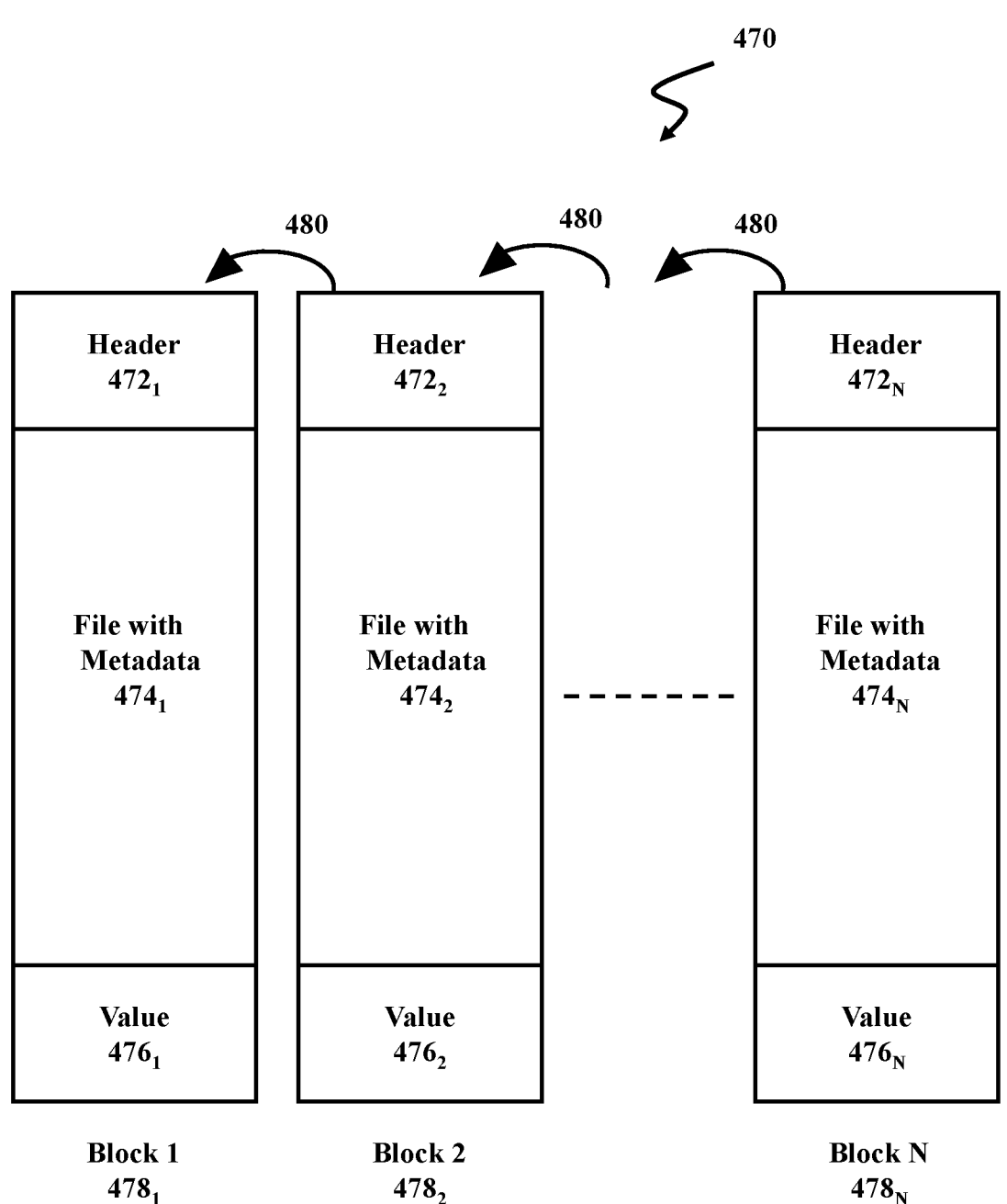
FIG. 4C illustrates a blockchain for digital content, according to example embodiments.

FIG. 4C illustrates a blockchain 470 for digital content in accordance with some embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable for use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In some embodiments, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | . . . | Block N |
|---|---|---|---|
| Hash Value 1 | Hash Value 2 | | Hash Value N |
| Digital Content 1 | Digital Content 2 | | Digital Content N |

In some embodiments, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
| --- | --- |
| Block 1 Hash Value | Block 1 Hash Value . . . Content |
| . | . |
| . | . |
| . | . |
| Block N Hash Value | Block N Hash Value . . . Content |

In the example embodiment of FIG. 4C, the blockchain 470 includes a number of blocks $478_1$, $478_2$, . . . $478_N$ cryptographically linked in an ordered sequence, where $N \geq 1$. The encryption used to link the blocks $478_1$, $478_2$, . . . $478_N$ may be any of a number of keyed or un-keyed Hash functions. In some embodiments, the blocks $478_1$, $478_2$, . . . $478_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant Pseudo Random Function (PRF). In another embodiment, the blocks $478_1$, $478_2$, . . . , $478_N$ may be cryptographically linked by a function that is different from a hash function. For purposes of illustration, the following description is made with reference to a hash function, e.g., SHA-2.

Each of the blocks $478_1$, $478_2$, . . . , $478_N$ in the blockchain includes a header, a version of the file, and a value. The header and the value are different for each block as a result of hashing in the blockchain. In some embodiments, the value may be included in the header. As described in greater detail below, the version of the file may be the original file or a different version of the original file.

The first block $478_1$ in the blockchain is referred to as the genesis block and includes a header $472_1$, original file $474_1$, and an initial value $476_1$. The hashing scheme used for the genesis block, and indeed in all subsequent blocks, may vary. For example, all the information in the first block $478_1$ may be hashed together at one time, or a portion of the information in the first block $478_1$ may be separately hashed and then a hash of the separately hashed portions may be performed.

The second header $472_1$ may include one or more initial parameters, which, for example, may include a version number, timestamp, nonce, root information, difficulty level, consensus protocol, duration, media format, source, descriptive keywords, and/or other information associated with original file $474_1$ and/or the blockchain. The first header $472_1$ may be generated automatically (e.g., by blockchain network managing software) or manually by a blockchain participant. Unlike the header in other blocks $478_2$ to $478_N$ in the blockchain, the header $472_1$ in the genesis block $478_1$ does not reference a previous block, simply because there is no previous block.

The original file $474_1$ in the genesis block may be, for example, data as captured by a device with or without processing prior to its inclusion in the blockchain. The original file $474_1$ is received through the interface of the system from the device, media source, or node. The original file $474_1$ is associated with metadata, which, for example, may be generated by a user, the device, and/or the system processor, either manually or automatically. The metadata may be included in the first block $478_1$ in association with the original file $474_1$.

The value $476_1$ in the genesis block is an initial value generated based on one or more unique attributes of the original file $474_1$. In some embodiments, the one or more unique attributes may include the hash value for the original file $474_1$, metadata for the original file $474_1$, and other information associated with the file. In one implementation, the initial value $476_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata.

The other blocks $478_2$ to $478_N$ in the blockchain also have headers, files, and values. However, unlike header $472_1$ the first block, each of the headers $472_2$ to $472_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 480, to establish an auditable and immutable chain-of-custody.

Each of the headers $472_2$ to $472_N$ in the other blocks may also include other information, e.g., version number, timestamp, nonce, root information, difficulty level, consensus protocol, and/or other parameters or information associated with the corresponding files and/or the blockchain in general.

The files $474_2$ to $474_N$ in the other blocks may be equal to the original file or may be modified versions of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $476_2$ to $476_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file may include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

In some embodiments, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)

b) new storage location for the file c) new metadata identified associated with the file d) transfer of access or control of the file from one blockchain participant to another blockchain participant.

FIG. 4D illustrates a block 490 which may represent the structure of the blocks in the blockchain (e.g., 470) in accordance with some embodiments. The block, e.g., Block$_i$, includes a header 472$_i$, a file 474$_i$, and a value 476$_i$.

The header 472$_i$ includes a hash value of a previous block Block$i-1$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file 474$_i$ includes a plurality of data, such as Data 1, Data 2, . . . , Data N in sequence. The data are tagged with Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference REF 1, REF 2, . . . , REF N to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value 476$_i$ is a hash value or other value computed based on any of the types of information previously discussed. For example, for any given block, Blocki, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the block 490 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender may have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Figure 5:
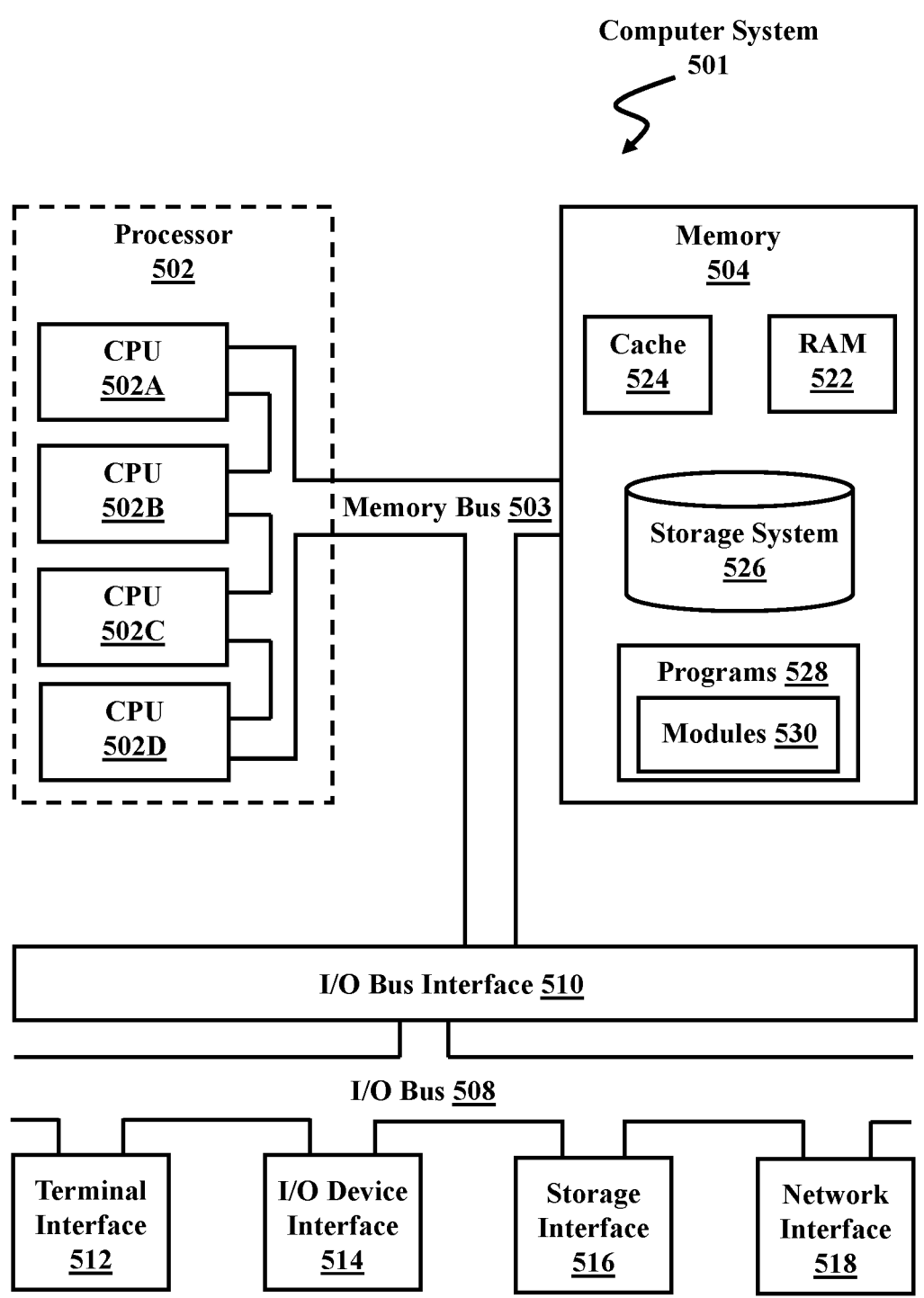
FIG. 5 illustrates a high-level block diagram of an example computer system that may be used in implementing one or more of the methods, tools, and modules, and any related functions, described herein, in accordance with embodiments of the present disclosure.

FIG. 5, illustrated is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

The advent of blockchain technology and decentralization have spurred interest in the concept of decentralized identity. Decentralization may give users back power over the way users share access to their personal information on the blockchain. One component of decentralized identity is a digital wallet in which users store credentials from authorized issuers (e.g. government agencies). The credentials may provide assurances (e.g., a reasonable amount of certainty) about the validity of some information associated with the user (e.g., the user's age). Accordingly, the users may leverage these credentials to prove claims about themselves (e.g., user's age is greater than 18 years) to other users of the blockchain. As used herein, to "prove" a thing should be understood to mean providing sufficient evidence of a thing such that the truth/existence/validity of that thing has been reasonable established (e.g., such that "proving" a thing should not be understood to mean providing irrefutable evidence that a thing is undeniably true/existent/valid). In keeping with the decentralized nature of the blockchain, users may obtain credentials from more than one issuer. Further, the concept of decentralized identity encourages users to collect multiple credentials as they use the blockchain.

Although blockchain is a valuable tool for proving credentials, the question becomes how users can employ them without undermining their own privacy. For example, users may reveal their credentials whenever they are asked to prove that they hold them (i.e. when submitting a transaction to the blockchain). However, such an arrangement may expose users to tracing attacks because blockchain participants may be able to determine if two different transactions originate from the same user or not. To prevent such a risk, zero-knowledge proofs may prove knowledge of a credential instead of disclosing it. This is akin to anonymous credentials, which allow users to prove statements about themselves without disclosing any information beyond the veracity of the statements. Anonymous credentials, however, were initially designed for single-issuer settings, and as such, may not be efficient for multi-issuers settings. For example, user proves that it holds N credentials from N issuers by calling a proof N times the proof generation in anonymous credentials.

Thus, there is a need for a system that is able to verify attributes (e.g., age, citizenship, financial accreditation, etc.) of a user without providing the recipient with the information needed to verify the attribute.

Therefore, in some embodiments, a method is proposed for facilitating anonymous proofs for a user with an aggregate of anonymous credentials. In some embodiments, the method may reduce the work required by the user. In some embodiments, the method enables the user to aggregate user credentials in such a way that the user obtains one credential that the user may use to generate zero-knowledge proofs. More specifically, some embodiments may aggregate credentials for a single user. In this way, embodiments may prevent multiple colluding users from mixing and matching their credentials to bypass security measures). In some embodiments, the system may employ Groth signatures on the blockchain to uniquely associate each user in the system to a tag and a public key pair. Further, some embodiments may extend Waters signatures to support tags and aggregation, and to accredit user attributes. Groth's signature scheme allows one to sign a vector of group elements.

Waters signatures forms a simple and efficient digital signature scheme in pairing friendly groups.

In some instances, anonymous credentials allow users to prove statements about themselves without disclosing their identities. The user obtains a credential (i.e., signature) from an authorized issuer based on its secret key and set of attributes. To prove possession of an attribute, the user leverages zero-knowledge proofs to show that (i) the user knows a credential from the authorized issuer, (ii) the user knows the corresponding secret key and (iii) that the credential encodes the disclosed attribute. However, earlier versions of the anonymous credential protocol targeted the single-issuer setting, and do not hide the identity of the issuer. Accordingly, delegable credentials can address this shortcoming by having a root authority delegate that issue capabilities to intermediate authorities, in such a way that proving possession of a valid credential may merely reveal the identity of the root authority, not the identity of the issuer. However, both anonymous and delegable credentials may not be efficient for scenarios where users collect credentials from multiple and various issuers. For example, generating a zero-knowledge proof that a user obtained credentials from N issuers using existing protocols may amount to running the zero-knowledge proof protocol N times.

Figure 6:
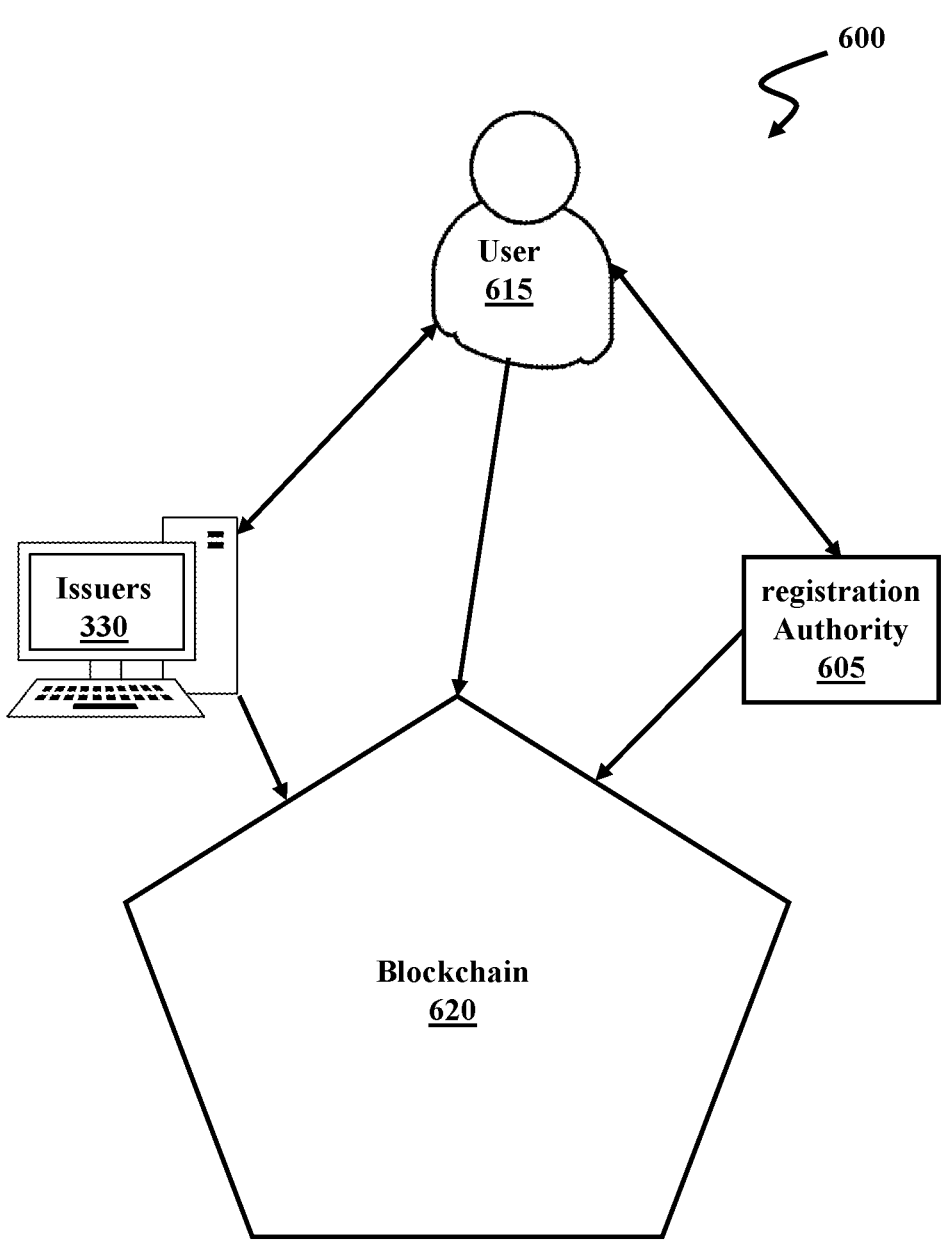
FIG. 6 illustrates an example system for enacting aggregate anonymous credentials, according to example embodiments.

FIG. 6 depicts an example system 600 for enacting aggregate anonymous credentials. In some embodiments, the system may include a registration authority 605, one or more issuers 610, one or more users 615, and a blockchain network 620.

In some embodiments, registration authority 605 enrolls users 615 into the system by providing the users 615 with a credential that associates their unique tag with their public key.

In some embodiments, each issuer, of the one or more issuers 610, is in charge of generating credentials for an attribute. In the described examples, there is a one-to-one mapping between issuers and attributes, however other mapping schemes are possible.

In some embodiments, one or more users 615 are each assigned a unique tag and a unique public key at registration. Once registered, a user can obtain credentials for its attributes from the authorized issuers.

In some embodiments, blockchain network 620 serves as a permissioned bulletin board that is used by: (i) issuers to announce their public keys and the attributes they are responsible for and (ii) users to publish their transactions and prove statements about themselves. The blockchain is managed by a set of administrators that set up its public parameters, including the public key of registration authority that users go to enroll.

The system may perform two basic functions to aggregate anonymous credentials. The system may define user credentials, and a user may prove it has the attributes.

Initially, the system may define a user credential for an attribute $\alpha$ as a tuple ($\tau$, upk, $\alpha$, $\Psi$, $\Phi$), whereby $\tau$ is the user's unique tag, upk is the user's public key, $\Psi$ is a Groth signature from the registration authority on ($\tau$, pk), and $\Phi$ is an extended Waters signature on tag r and attribute $\alpha$.

The user may prove that it has attributes ($\alpha_1$, . . . , $\alpha_N$) by computing a zero-knowledge proof of knowledge of tag $\tau$, a public key upk, secret key usk, signatures $\Phi$ and $\Psi$ such that the following statements hold:

$\Psi$ is a valid signature on (i, upk) from the registration authority;

$\Phi$ is a valid aggregate signature on attributes $\alpha_i$ for $1 \le i \le N$ under tag $\tau$; and usk is the secret key corresponding to upk.

In some embodiments, extended Waters signatures are computed in such a way that one can successfully aggregate signatures on different attributes as long as the signatures are generated under the same tag $\tau$.

Further details follow in FIG. 7 below.

Figure 7:
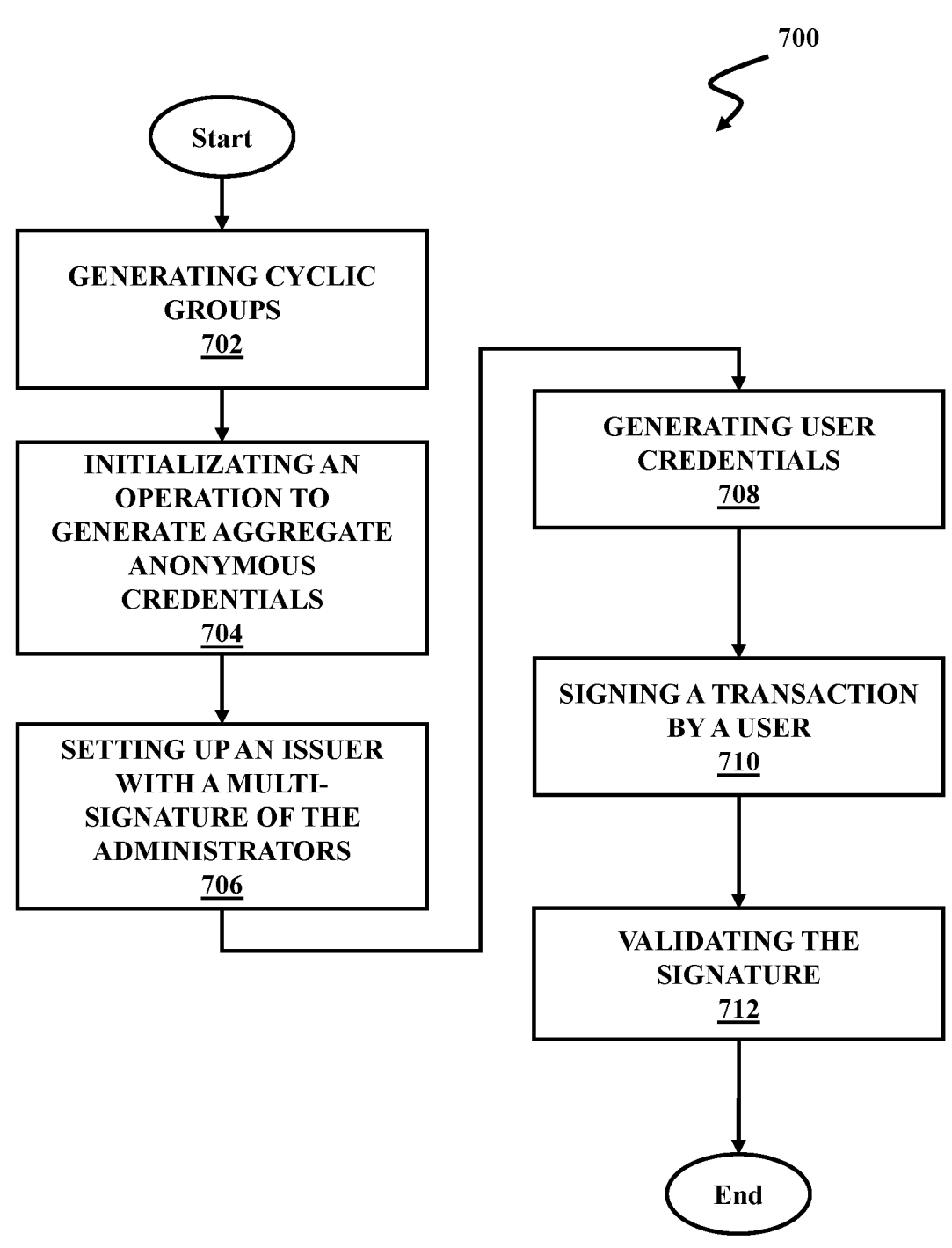
FIG. 7 illustrates a flowchart of an example method for aggregate anonymous credentials and applications to decentralized identity in blockchain systems, according to example embodiments.

FIG. 7 illustrates an example method 700 for aggregating anonymous credentials and applications to decentralized identity in blockchain systems.

FIG. 7 begins with block 702 generating cyclic groups. In some embodiments, a cyclic group is a mathematical element that may be used as the basis for cryptographic primitives. In some embodiments, the system may generate multiple cyclic groups. For example, $G_1$, $G_2$ and $G_t$ be three cyclic groups of prime order p that admit bilinear pairing e: $G_1 \times G_2 \rightarrow G_t$. In some instances, a group G may be generated by a single element, so that every element in G is a derivative of a generated integer. In some embodiments, the system may include multiple random generators. For example, g and g may be two random generators of $G_1$ and $G_2$ respectively. The system may denote startup parameters for a collection of the groups by setup parameters (sp)=(p, $G_1$, $G_2$, $G_t$, e, g, g̃). In some embodiments, the system may use the building blocks sp as a default input. In some instances, f is an additional random generator of $G_1$.

In some embodiments, a Groth signature is a structure-preserving signature that functions in bilinear-pairing groups and a sign vector of messages in $G_1$. The Groth signature consists of three algorithms Keygen, Sign, and Verify.

In some embodiments, the Keygen(l)→(sk, pk) is performed on the input of integer l denoting the number of elements comprising the secret key, where the Keygen randomly selects a vector sk=($\alpha$, $\beta_1$, . . . , $\beta_{l-1}$)←\$ $Z_p^l$ and computes pk (public key)←($\tilde{\alpha}$, $\tilde{b}_1$, . . . , $\tilde{b}_{l-i}$)=($\tilde{g}^\alpha$, $\tilde{g}^{\beta^1}$, . . . , $\tilde{g}^{\beta^{l^{-1}}}$).

In some embodiments, the Sign(sk, $\vec{m}$)→$\Psi$ is performed on the input of secret key sk=($\alpha$, $\beta_1$, . . . , $\beta_{l-1}$) and vector of messages $\vec{m}$=($m_1$, . . . , $m_l$)$\notin G_1^l$, where Sign randomly selects $\rho \in Zp$ and outputs $\Psi$=($\tilde{r}$, s, t) such that a random number is used to compute $\tilde{r}$, s and t. Equation 1 details an example of how r, s and t are created.

$$\tilde{r} = \tilde{g}^{1/\rho}; s = (fg^\alpha)^\rho; t = \left(h^\alpha m_l \prod_{i=1}^{l-1} m_i^{\beta i}\right)^\rho \quad \text{(EQUATION 1)}$$

In some embodiments, Verify(pk, $\vec{m}$, $\Psi$)→bool is performed on the input of public key pk=($\tilde{\alpha}$, $\tilde{b}_1$, . . . , $\tilde{b}_{l-1}$), vector $\vec{m}$=($m_1$, . . . ,$m_l$)$\in G_1^l$, and signature $\Psi$=($\tilde{r}$, s, t), Verify outputs a Boolean bool such that bool=true if equation 2 and 3 hold true. Equation 2 and 3 are a type of bilinear paring verification that is used to determine if the signature is correct. Equation 2 determines if the relation between s and r and in equation 3 t and r are verified.

$$e(s,r)=e(f,\tilde{g})e(g,\tilde{\alpha}) \quad \text{(EQUATION 2)}$$

$$e(t, \tilde{r}) = e(f, \tilde{\alpha})e(ml, \tilde{g}) \prod_{i=1}^{l-1} e(m_i, \tilde{b}_i) \quad \text{(EQUATION 3)}$$

If the relations are not verified, Verify returns bool=false.

In some instances, Waters signatures can be shown to be existentially unforgeable under chosen-message attacks under the assumption that the computational Diffie-Hellman problem in the underlying group is hard. The corresponding security proof has a reduction loss of $O(1 \cdot q)$, where $1$ is the bitlength of messages, and $q$ is the number of adversarial signature queries.

In some instances, $H_G$: $\{0, 1\}^* \rightarrow G_1$ is a cryptographic hash function and $(u_0, u_1, \ldots, u_n) \leftarrow\$ G^{n+1}_1$ is a vector of random generators of $G_1$.

Extended Waters signature involve three algorithms Keygen, Sign and Verify.

In some instances, the Keygen$(\cdot) \rightarrow$(sk, pk) randomly selects sk$\leftarrow\$ Zp$ and computes $pk = g^{sk}$.

In some instances, the Sign(sk, $\tau$,m)$\rightarrow \Phi$ is performed on input of secret key sk, tag $\tau = (\tau_1, \ldots, \tau n) \in \{0, 1\}^n$ and message $m \in \{0, 1\}^*$. Further, Sign randomly picks v (a random number) and outputs a signature $\Phi = (v,w)$ where equations 4 and 5 are used to compute $\tilde{v}$ and w. This signature will later be used to show that a user has a given attribute. In some instances, the signature is computed based on a message and tag T.

$$\tilde{v} = \tilde{g}^v \qquad \text{(EQUATION 4)}$$

$$w = H_G(m)^{sk}\left(u0\prod\nolimits_{i=1}^{n} u_i^{\tau_i}\right)^v \qquad \text{(EQUATION 5)}$$

In some instances, the Verify(pk, $\tau$,m, $\Phi$)$\rightarrow$bool is performed on the input of public key pk, tag $\tau = (\tau_{1_2} \ldots, \tau_n) \in \{0, 1\}$, message $m \in \{0, 1\}^*$, and signature $\Phi = (v,w)$. Further, Verify $$\text{outputs bool = true if } e(w, \tilde{g}) = e(H_G(m), pk)e\left(u_0\prod\nolimits_{i=1}^{n} u_i^{\tau_i}, \tilde{v}\right);$$

else, Verify outputs bool=false.

In some instances, the Agg$(\Phi_1, \ldots, \Phi_N) \rightarrow \Phi$ is performed on input of signatures $\Phi_1, \ldots, \Phi_N$ such that $\Phi_i = (\tilde{v}_i, w_i) \leftarrow$Sign(sk$_i$, $\tau$,$\tilde{m}_i$), Agg outputs:

$$\Phi = (\tilde{v}, w) \text{ such that } \tilde{v} = \prod\nolimits_{i=1}^{n} \tilde{v}_i \text{ and } \tilde{w} = \prod\nolimits_{i=1}^{n} w_i \qquad \text{(EQUATION 6)}$$

In some instances, the VerAgg($\overrightarrow{pk}$, $\tau$, $\overrightarrow{m}$, $\Phi$)$\rightarrow$bool is performed on input of vector of public keys $\overrightarrow{pk} = (pk_1, \ldots, pk_N)$, tag $\tau \in \{0, 1\}^n$ and vector of messages $\overrightarrow{m} = (m_1, \ldots, m_N)$, VerAgg outputs bool=true if equation 7 holds true. Else, VerAgg returns bool=false.

$$e(w, \tilde{g}) = \prod\nolimits_{i=1}^{N} e(HG(m_i), pk_i)e\left(u_0\prod\nolimits_{i=1}^{n} u_i^{\tau_i}, \tilde{v}\right) \qquad \text{(EQUATION 7)}$$

FIG. 7 continues with block 704 of initialization of an operation to generate aggregate anonymous credentials by the registration authority.

In some embodiments, the registration authority calls (sk, pk)$\leftarrow$Groth.Keygen(2) and provides the blockchain administrators with pk to sign two messages at once a message with the public key of the user and a message with the unique identifier of the user. The administrators submit a transaction tx=(Init, pk, $\sigma$) to the blockchain, where $\sigma$ is multi-signature of the administrators on message (Init, pk).

This transaction is accepted if this is the first Init transaction for the user unique identifier and $\sigma$ is a valid multi-signature from the blockchain administrators.

FIG. 7 continues with block 706 of setting up an issuer with a multi-signature of the administrators. In some embodiments, to join the blockchain, an issuer first calls (isk, ipk)$\leftarrow$ExWaters.Keygen($\cdot$), and contacts the administrators with its public key ipk and attribute $\alpha$ for which the issuer may generate user credentials. The administrators check if I is allowed to produce such credentials and if the issuer knows the secret key matching ipk. If the administrators are convinced, they may jointly submit a transaction tx=(join, ipk, $\alpha$, $\sigma$) whereby $\sigma$ is a multi-signature of the administrators on message (join, ipk, $\alpha$).

Transaction tx=(join, ipk, $\alpha$, $\sigma$) is validated by checking that there is no previous joint transaction with public key ipk or attribute $\alpha$ and that $\sigma$ is a valid multi-signature relative to the administrators' public keys.

FIG. 7 continues with block 708 of generating user credentials. The user may provide an issuer a public key and a unique identifier to the issuer so the issuer can generate a certificate on the attributes of the issuer. Thus, the user may have a certificate with the public key and the unique identifier.

In some embodiments, the user presents the issuer with a credential request including an attribute, a public key, and the user's unique identifier. In some embodiments, generating user credentials may include public key registration. In some embodiments, a user U contacts the registration authority to register its public key upk=$g^{usk}$. The registration request contains U's public key upk and a unique tag $\tau \in \{0, 1\}^n$. On receiving the registration request, the registration authority engages in an interactive zero-knowledge proof with U so that U proves knowledge of secret key usk corresponding to upk. If the proof is valid, then the registration authority submits a transaction (register, upk, $\tau$, $\Psi$) such that $\Psi \leftarrow$Groth.Sign(sk, (upk, h)) where $$h = u_0\prod\nolimits_{i=1}^{n} u_i^{\tau_i}.$$

In some embodiments, the transaction is accepted if there is no recorded register transaction with either upk or $\tau$ and if $\Psi$ is a valid signature on message (upk, h) with $$h = u_0\prod\nolimits_{i=1}^{n} u_i^{\tau_i},$$

where $\tau$ is the user's unique identifier. In some instances, certain authorities or issuers may be responsible for certain attributes. For example, a driving credential issuer may be responsible for proof of driver's license. Thus, a user attempting to prove possession of a driver's license may go to the driving credential issuer to acquire the corresponding credential.

In some embodiments, the user U obtains a credential for its attribute $\alpha$ (e.g., age citizenship, diploma, or any claim of a user that can be verified) by U sending a credential request ($\alpha$, upk, $\tau$) and I checking if there is a register transaction with pair (upk, $\tau$); if so, then I engages in an interactive zero-knowledge proof with U so that U proves knowledge of secret key usk underlying upk. In some instances, if the proof is valid, then I returns the user credentials as $\Phi \leftarrow$ExWaters.Sign(isk, $\tau$, $\alpha$).

FIG. 7 continues with block 710 of signing a transaction by a user. In some embodiments, a user may compute an aggregate signature to sign a message m (e.g. the payload of a transaction) anonymously while disclosing attributes $\alpha_1, \ldots, \alpha_N$. For example, a user may compile a list of attributes that the user is attempting to prove from several different issuers (e.g., driving record issuer, age issuer, citizenship issuer, etc.).

In some embodiments, the user may compute aggregate signature $\Phi \leftarrow$ ExWaters.Agg($\Phi_1, \ldots, \Phi_N$) where $\Phi_i$ is a signature on attribute $\alpha_i$ under tag $\tau$, from issuer $I_i$ associated with public key $ipk_i$. Further, the user may use the aggregate signature to sign the transaction.

FIG. 7 continues with block 712 of validating the signature. In some embodiments, the user may prove using a non-interactive zero-knowledge proof knowledge of tuple (upk, h, $\Phi=(\tilde{\upsilon},w)$, $\Psi$, $\zeta$) such that:

$$e(w, \tilde{g}) = \prod_{i=1}^{n} e(H_G(\mathfrak{a}_i), ipk_i)e(h, \tilde{\upsilon}) \qquad \text{(EQUATION 8)}$$

Thus, providing multiple attributes that may be proved by passing a extended waters validation (in equation 8).

$$\text{true} \leftarrow \text{Groth.Verify}(pk,(upk,h),\Psi)(\text{EQUATION 9})$$

In some instances, true$\leftarrow$Groth.Verify(pk, (upk, h), P) indicates that the user is already registered.

$$\text{true} \leftarrow \text{Schnorr.Verify}(upk,m,\zeta) \qquad \text{(EQUATION 10)}.$$

In some instances, a true$\leftarrow$Schnorr.Verify(upk, m, $\zeta$) implies that $\zeta$ is a valid Schnorr signature under public key upk, which in turn implies that $\zeta$ is computed by a party that knows the secret key matching upk, thus demonstrating the proof of attributes.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system comprising:
a memory; and
a processor in communication with the memory, the processor being configured to:
   generate cyclic groups;
   receive an aggregate anonymous credential, based on the cyclic groups, generated by a regulatory authority and one or more issuers of the system, wherein the aggregate anonymous credential comprises a first public key and a unique identifier, the first public key and the unique identifier associated with a user;

set up the aggregate anonymous credential generated by the regulatory authority with a multi-signature of administrators of the system;

set up an issuer from the one or more issuers with the multi-signature of administrators of the system using a second public key and one or more issuer attributes to generate user credentials, wherein the second public key and the one or more issuer attributes are associated with the issuer, the user credentials being generated by the regulatory authority;

receive the user credentials generated by the regulatory authority and the one or more issuers in the system in response to receiving a credential request from the user, wherein the credential request comprises at least one user attribute from one or more user attributes, the first public key, and the unique identifier associated with the user;

in response to receiving the user credentials, compute an aggregate signature to sign anonymously; and validate computed aggregate signature.

2. The system of claim 1, the processor is further configured to:
provide, by the regulatory authority, one or more blockchain administrators with the first public key; and
submit, by the one or more blockchain administrators, an operation with the multi-signature of the one or more blockchain administrators.

3. The system of claim 2, the processor is further configured to:
contact, by the regulatory authority, the one or more blockchain administrators with the first public key;
contact, by the issuer, the one or more blockchain administrators with the second public key and an issuer attribute from the one or more issuer attributes; and
generate the user credentials in response to contacting the one or more blockchain administrators by the one or more issuers with the second public key and the one or more issuer attributes.

4. The system of claim 3, the processor is further configured to:
receive validation, from the user, that there is a register operation with the unique identifier of the user and the first public key of the user.

5. The system of claim 1, the processor is further configured to:
receive, from the user, the computed aggregate signature that disclosing the one or more user attributes.

6. The system of claim 5, the processor is further configured to:
receive, from the user, a signed operation with the computed aggregate signature.

7. The system of claim 1, the processor is further configured to:
validate the computed aggregate signature with a non-interactive zero-knowledge proof.

8. A method comprising:
generating cyclic groups;
receiving an aggregate anonymous credential, based on the cyclic groups, by a regulatory authority and one or more issuers of the system, wherein the aggregate anonymous credential comprises a first public key and a unique identifier, the first public key and the unique identifier associated with a user;
setting up the aggregate anonymous credential generated by the regulatory authority with a multi-signature of administrators of the system;

setting up an issuer from the one or more issuers with the multi-signature of administrators of the system, using a second public key and one or more issuer attributes to generate user credentials, wherein the second public key and the one or more issuer attributes are associated with the issuer, the user credentials being generated by the regulatory authority;

receiving the user credentials generated by the regulatory authority and the one or more issuers in the system in response to receiving a credential request from the user, wherein the credential request comprises at least one user attribute from one or more user attributes, the first public key, and the unique identifier associated with the user;

in response to receiving the user credentials, compute an aggregate signature to sign anonymously; and validating the computed aggregate signature.

9. The method of claim 8, the method further comprising:

providing, by the regulatory authority, one or more blockchain administrators with the first public key; and submitting, by the one or more blockchain administrators, an operation with the multi-signature of the one or more blockchain administrators.

10. The method of claim 9, the method further comprising:

contacting by the regulatory authority, the one or more blockchain administrators with the first public key;

contacting, by the issuer, the one or more blockchain administrators with the second public key and an issuer attribute from the one or more issuer attributes; and generating the user credentials in response to contacting the one or more blockchain administrators by the one or more issuers—with the second public key and the one or more issuer attributes.

11. The method of claim 10, the method further comprising:

receiving validation, from the user, that there is a register operation with the unique identifier of the user and the first public key of the user.

12. The method of claim 8, the method further comprising:

receiving, from the user, the computed aggregate signature that disclosing the one or more user attributes.

13. The method of claim 12, the method further comprising:

receiving, from the user, a signed operation with the computed aggregate signature.

14. The method of claim 8, the method further comprising:

validating the computed aggregate signature with a non-interactive zero-knowledge proof.

15. A computer program product comprising a computer readable storage medium having program instructions embodied therewith, the program instructions executable by a processor to cause the processor to:

generate cyclic groups;

receive an aggregate anonymous credential, based on the cyclic groups, by a regulatory authority and one or more issuers of the system, wherein the aggregate anonymous credential comprises a first public key and a unique identifier, the first public key and the unique identifier associated with a user;

set up the aggregate anonymous credential generated by the regulatory authority with a multi-signature of administrators of the system;

set up an issuer from the one or more issuers with the multi-signature of administrators of the system, using a second public key and one or more issuer attributes to generate user credentials, wherein the second public key and one or more issuer attributes are associated with the issuer, the user credentials being generated by the regulatory authority;

receive the user credentials generated by the regulatory authority and the one or more issuers in the system in response to receiving a credential request from the user, wherein the credential request comprises at least one user attribute from one or more user attributes, the first public key, and the unique identifier associated with the user;

in response to receiving the user credentials, compute an aggregate signature to sign anonymously; and validate the computed aggregate signature.

16. The computer program product of claim 15, the processor to:

provide, by the regulatory authority, one or more blockchain administrators with the first public key; and submitting, by the one or more blockchain administrators, an operation with the multi-signature of the one or more blockchain administrators.

17. The computer program product of claim 16, the processor to:

contact, by the regulatory authority, the one or more blockchain administrators with the first public key;

contact, by the issuer, the one or more blockchain administrators with the second public key and an issuer attribute from the one or more issuer attributes; and generate the user credentials in response to contacting the one or more blockchain administrators by the one or more issuers with the second public key and the one or more issuer attributes.

18. The computer program product of claim 17, the processor to:

receiving validation, from the user, that there is a register operation with the unique identifier of the user and the first public key of the user.

19. The computer program product of claim 15, the processor to:

receive, from the user, the computed aggregate signature disclosing the one or more user attributes.

20. The computer program product of claim 19, the processor to:

receive, from the user, a signed operation with the computed aggregate signature.

* * * * *